United States Patent
Justine et al.

(10) Patent No.: US 9,677,198 B2
(45) Date of Patent: *Jun. 13, 2017

(54) HYBRID CORD CONSISTING OF AT LEAST TWO MULTIFILAMENT YARNS TWISTED TOGETHER

(71) Applicant: CONTINENTAL REIFEN DEUTSCHLAND GMBH, Hannover (DE)

(72) Inventors: Carole Justine, Scharrel (DE); Thomas Kramer, Herford (DE); Günter Wahl, Hohenhameln (DE); Kurt Uihlein, Großheubach (DE); Holger Scheytt, Erlenbach (DE); Dennis Rolf Mössinger, Darmstadt (DE); David Wunderlich, Niedernberg (DE); Britta Zimmerer, Amorbach (DE)

(73) Assignees: CONTINENTAL REIFEN DEUTSCHLAND GMBH, Hannover (DE); CORDENKA GMBH & CO. KG, Obernburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/775,431

(22) PCT Filed: Feb. 25, 2014

(86) PCT No.: PCT/EP2014/053565
§ 371 (c)(1),
(2) Date: Sep. 11, 2015

(87) PCT Pub. No.: WO2014/146869
PCT Pub. Date: Sep. 25, 2014

(65) Prior Publication Data
US 2016/0047069 A1    Feb. 18, 2016

(30) Foreign Application Priority Data
Mar. 18, 2013 (EP) .................................. 13159780

(51) Int. Cl.
*D02G 3/04* (2006.01)
*D02G 3/48* (2006.01)
*B60C 9/00* (2006.01)
*B60C 9/22* (2006.01)

(52) U.S. Cl.
CPC ............. *D02G 3/045* (2013.01); *B60C 9/005* (2013.04); *D02G 3/047* (2013.01); *D02G 3/48* (2013.01); *B60C 2009/0078* (2013.04); *B60C 2009/0085* (2013.04); *B60C 2009/0092* (2013.04); *B60C 2009/2214* (2013.04); *D10B 2201/24* (2013.01); *D10B 2331/02* (2013.01); *D10B 2331/021* (2013.01); *D10B 2331/04* (2013.01)

(58) Field of Classification Search
CPC ........... D02G 3/045; D02G 3/047; D02G 3/48
USPC ..................................... 57/237, 238
See application file for complete search history.

(56) References Cited

U.S. PATENT DOCUMENTS

| | | | |
|---|---|---|---|
| 3,388,117 A | 6/1968 | Roberts et al. | |
| 3,882,667 A * | 5/1975 | Barry | D02G 3/12 28/281 |
| 4,877,073 A * | 10/1989 | Thise | B60C 9/0042 152/451 |
| 6,261,689 B1 | 7/2001 | Meraldi et al. | |
| 6,601,378 B1 * | 8/2003 | Fritsch | D02G 3/28 57/237 |
| 6,775,970 B2 * | 8/2004 | Fernandez | D02G 3/285 57/238 |
| 7,690,180 B2 * | 4/2010 | Hegan, Jr. | D02G 3/28 57/238 |
| 2016/0001600 A1 * | 1/2016 | Justine | B60C 9/005 152/451 |

FOREIGN PATENT DOCUMENTS

| | | |
|---|---|---|
| DE | 10 2007 025490 A1 | 12/2008 |
| DE | 10 2009 003 359 A1 | 7/2010 |
| EP | 2 380 754 A2 | 10/2011 |
| GB | 685631 A | 1/1953 |

OTHER PUBLICATIONS

May 21, 2014 Search Report issued in International Patent Application No. PCT/EP2014/053565.

* cited by examiner

Primary Examiner — Shaun R Hurley
(74) Attorney, Agent, or Firm — Oliff PLC

(57) ABSTRACT

A hybrid cord of at least two multifilament yarns twisted together is described, where the first yarn is a viscose multifilament yarn and the second yarn is a non-metallic multifilament yarn composed of a material that is not identical to the first multifilament yarn. The viscose multifilament yarn is conditioned in the standard climate in accordance with DIN EN ISO 139-1:2005, and has a yarn linear density <1100 dtex and a breaking tenacity of ≥45 cN/tex. The hybrid cord has a cord linear density of ≤3000 dtex.

25 Claims, 2 Drawing Sheets

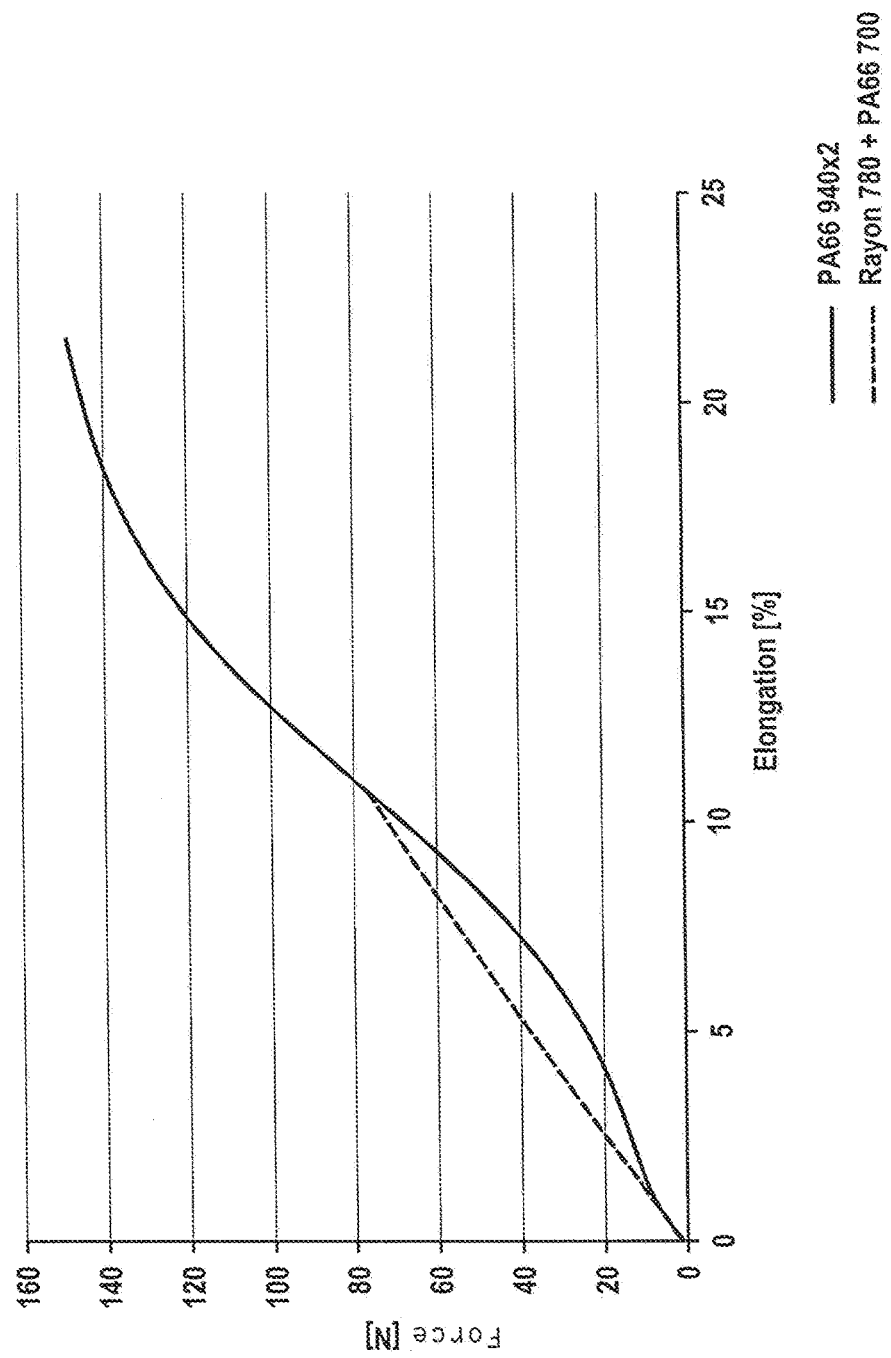

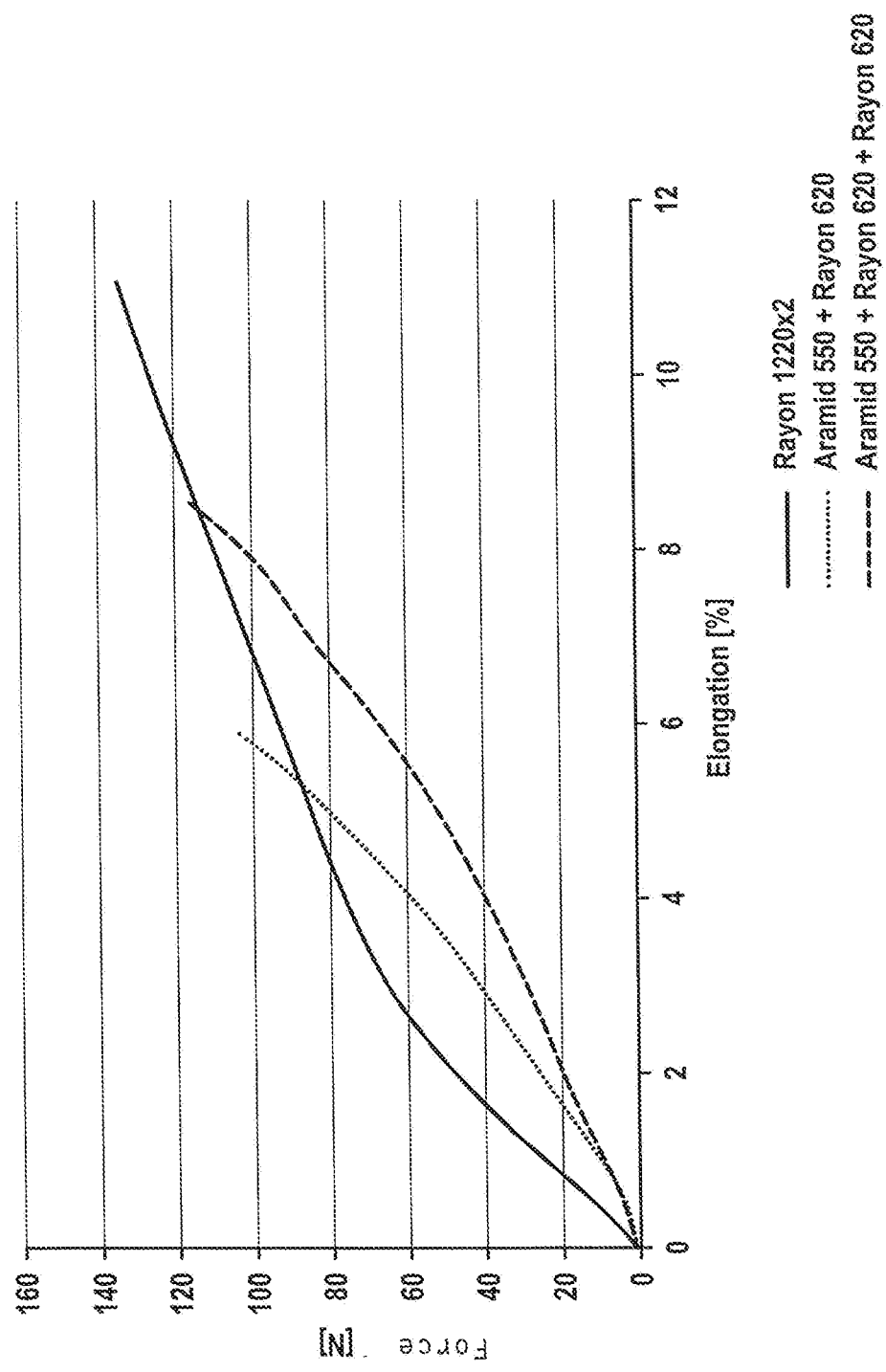

HYBRID CORD CONSISTING OF AT LEAST TWO MULTIFILAMENT YARNS TWISTED TOGETHER

The invention relates to a hybrid cord of at least two multifilament yarns twisted together, the first yarn being a viscose multifilament yarn and the further multifilament yarn being a non-metallic multifilament yarn consisting of a material that is not identical to the material of the first multifilament yarn.

BACKGROUND

Hybrid cords are threadlike reinforcement elements that are used for example in industrial rubber products and (pneumatic) vehicle tires.

Hybrid cords are sufficiently known to persons skilled in the art and are characterized in that the at least two yarns of this hybrid cord consist of different materials. As a result, the physical properties of the hybrid cord can be set on the one hand via the targeted selection of material of the individual yarns and on the other hand via their construction.

DE 10 2009 003 359 AI, for example, has disclosed a hybrid cord for use in a pneumatic vehicle tire that consists of a rayon multifilament yarn and a PET multifilament yarn. The yarn linear density of the rayon multifilament yarn is 1840 dtex, and the yarn linear density of the PET multifilament yarn is 1440 dtex. The hybrid cord has a diameter commonly used to date. The rayon multifilament yarn is classed with viscose multifilament yarns.

However, due to reasons of cost savings, an effort is made to use reinforcement elements with smaller diameters, although these reinforcement elements should have approximately the same physical properties as reinforcement elements with a conventional diameter.

An effort is also made to use renewable raw materials whenever possible.

Cellulose is the most frequently encountered and most important naturally occurring polymer. In addition to cellulosic shaped bodies, like paper, blown films, cellophane, and sponge cloths, cellulosic fibers are considered among the most important industrial products and are used primarily for clothing purposes, as insulating materials and as industrial reinforcement elements.

Cellulosic fibers, filaments and multifilaments can be obtained in a wide variety of ways and in different forms which are also known to persons skilled in the art. The most common processes are the so-called regeneration processes in which cellulose is first converted chemically into soluble unstable or easily saponifiable derivatives and dissolved. For example, cellulose acetate, cellulose formate, or cellulose carbamate are known as soluble derivatives from which cellulose can be regenerated. In the most important method, the viscose method, the unstable derivative is a cellulose xanthogenate, and the yarns produced using the viscose method are known as viscose or rayon yarns. In the viscose method, the solution is pumped through spinnerets and regenerated to form viscose filaments in a coagulation bath, washed and sized (and functionally coated if necessary) in one or more post-treatment steps, and subsequently wound up on endless bobbins or processed into cut fibers. More recently, however, cellulosic fibers in the form of chopped fibers are also being used increasingly in thermoplastic reinforcement, e.g. in PP/rayon composite materials, in the form of uni- and bidirectional woven fabrics, and also for reinforcing duromers such as epoxy resins.

High-tenacity cellulosic multifilament yarns with low yarn linear density, i.e. a smaller yarn diameter, are known as such.

For example, ultra-high-tenacity yarns made of cellulose formate and cellulose modified by formaldehyde with a low overall linear density are known. For example, cellulose formate fibers are described in patent publication U.S. Pat. No. 6,261,689 which were conditioned at a temperature of (20±2)° C. and a relative humidity of (65±2)%, defined as a standard climate according to EN ISO 20139 (currently: DIN EN ISO 139), and have an overall linear density of 460 dtex and a tenacity of 76 cN/tex.

Patent publication U.S. Pat. No. 3,388,117 describes cellulosic fibers modified by formaldehyde with an overall linear density of 485 dtex and a conditioned tenacity of 78 cN/tex.

Not described in the prior art, however, are high-tenacity viscose multifilament yarns with an overall linear density <1100 dtex.

While GB 685,631 B describes rayon yarns, i.e. viscose multifilament yarns made of 100 individual filaments with a low overall linear density of 100 den (110 dtex), they have a conditioned tenacity of only 2.3 g/den (20.4 cN/tex) and a tenacity in the oven-dried state of 2.9 g/den (25.6 cN/tex). In a further example, GB 685,631 B discloses yarns with a yarn linear density of 400 den (440 dtex) having 260 filaments and moderate tenacities of 4.1 g/den (36.2 cN/tex) in the conditioned viscose multifilament yarn and 5.3 g/den (46.8 cN/tex) in the oven-dried viscose multifilament yarn.

SUMMARY

The underlying object of the present invention is to provide an environmentally-friendly hybrid cord that has a comparatively small diameter, the physical properties thereof, however, corresponding approximately to diameters common to hybrid cords today.

The object is achieved by conditioning the viscose multifilament yarn in the standard climate according to DIN EN ISO 139-1:2015, then having a yarn linear density of <1100 dtex and a breaking tenacity of ≥45 cN/tex, and the hybrid cord having a cord linear density of <3000 dtex.

Thus, this tenacity gap in regenerated cellulose fibers with a low overall linear density is closed by a viscose multifilament yarn that was conditioned in the standard climate in accordance with DIN EN ISO 139-1:2005, then having a yarn linear density of <1100 dtex and a breaking tenacity of ≥45 cN/tex.

BRIEF DESCRIPTION OF THE DRAWING

Diagram 1 is a graph that shows the force/elongation curves of the inventive hybrid cord 1 described in Table 1 (rayon 780 to PA66 700) and a cord of the prior art (PA66 940×2).

Diagram 2 is a graph that shows the force/elongation curves of the inventive hybrid cords 2 and 3 described in Table 1 ((rayon 620+aramid 550) and (rayon 620+aramid 550+rayon 620)), as well as a cord of the prior art (rayon 1220×2).

DETAILED DESCRIPTION

According to the invention, an environmentally-friendly hybrid cord has been created that has a small diameter due to the low yarn linear density of the viscose multifilament yarn. Due to the still high breaking tenacity of the "thin"

viscose multifilament yarn, the hybrid cord has approximately the same physical properties as a thicker, comparable hybrid cord of the prior art.

The inventive hybrid cord can consist of two or more multifilament yarns, of which the first multifilament yarn is always a "thin" viscose multifilament yarn as described above, of which a second multifilament yarn always consists of a material that is not identical to that of the first multifilament yarn. The hybrid cord can, however, also have three or more multifilament yarns, of which a third multifilament yarn or further multifilament yarn can be identical to the material of the first or second multifilament yarn or consist of another non-metallic material.

The measurement of the conditioned textile data of the inventive viscose multifilament yarn takes place under the following conditions according to DIN EN ISO 2062:2009:

Conditioning time of ≥16 h in the standard climate

CRE [constant rate of extension] tensile strength testing machine with pneumatic clamps Testing of multifilament yarns with protective twist of 100 t/m (t/m=turns/m)

Clamping length of the test specimens: 500 mm

Traction speed (traverse speed): 500 mm/min (100%/min)

The conditioning and test conditions mentioned in the previously cited standards are comparable to the relevant standard for the synthetic fiber industry (BISFA, "Testing methods for viscose, cupro, acetate, triacetate and lyocell filament yarns", 2007 edition).

The viscose multifilament yarn is surprisingly obtained by the method described in Example 2 of GB 685,631, which is modified with respect to multiple technical characteristics that are described in the following.

Instead of cotton linters, pulp from coniferous wood is used.

Prior to the spinning process, viscose modifiers (e.g. amine ethoxylates like ethoxylated fatty acid amines or polyethylene glycols like PEG 1500) are added at a concentration in the range from 0.01 to 1.0 wt. % relative to the viscose.

Spinnerets with a hole diameter <100 μm are used, preferably with a hole diameter in the range from 40 to 80 μm.

The spinning speed at the first take-up reel is less than 50 m/min and lies preferably in the range from 10 to 40 m/min.

Transport of the thread from the spinneret into the coagulation bath is carried out by a spinning tube, wherein the transport of the thread in the spinning tube is supported by a flow of the coagulation bath in the direction of the fiber withdrawal.

The sulfuric acid concentration in the coagulation bath is greater than 15 g/liter and preferably lies in the range from 20 to 120 g/liter.

Sodium sulfate and zinc sulfate are added to the coagulation bath, preferably in a concentration from 25 to 250 g/liter coagulation bath.

The temperature of the coagulation bath is higher than 30° C. and lies preferably in the range from 40 to 95° C.

The downstream fixing bath contains sulfuric acid, preferably in a concentration in the range from 20 to 120 g/liter fixing bath and also serves as the decomposition bath for cellulose xanthogenate.

The spun yarn is drawn by more than 175%, and drawing preferably lies in a range from 180 to 220%.

The inventive viscose filament yarn is preferably produced in a two-stage process, wherein the yarn is spun and wound up in the first stage, and the coiled yarn is unwound and drawn in the second stage.

It is advantageous if the further multifilament yarn has a yarn linear density in the range from ≥50 to ≤1800 dtex, preferably in the range from ≥200 to ≤1200 dtex, particularly preferably in the range from ≥250 to ≤800 dtex. A hybrid cord has been created, the yarns of which each have a low yarn linear density and thus a small overall diameter, the physical properties of which, however, corresponding approximately to the diameters common to hybrid cords today.

It is advantageous if the hybrid cord has a cord linear density of ≤500 dtex, preferably a cord linear density of ≤2000 dtex. A thinner hybrid cord has been created.

It is advantageous if the viscose multifilament yarn has a yarn linear density in the range from ≥150 dtex to <1100 dtex and a breaking tenacity in the range from ≥45 cN/tex to ≤60 cN/tex. The high breaking tenacity per dtex enables a thin yarn linear density with respect to the breaking force.

It is appropriate if the viscose multifilament yarn has a yarn linear density in the range from ≥170 dtex to <900 dtex, preferably from ≥200 dtex to <800 dtex and a breaking tenacity in the range from ≥45 cN/tex to ≤56 cN/tex, preferably from ≥45 cN/tex to ≤53 cN/tex. By this means, advantages with respect to the fatigue properties of an industrial rubber product or of a pneumatic vehicle tire using the inventive hybrid cord, as well as with respect to the process capability, can be achieved.

It is advantageous, with respect to the fatigue resistance of a pneumatic vehicle tire that has a reinforcement layer as a carcass layer and/or belt binder and/or bead reinforcement containing the inventive hybrid cord, if the viscose multifilament yarn has a filament linear density in the range from 1.2 to 4.0 dtex, preferably from 2.4 to 3.0 dtex.

It is appropriate if the viscose multifilament yarn has an elongation at break in the range from ≥5% to ≤20%, preferably from ≥6% and ≤15%. An industrial rubber product or a vehicle tire with a reinforcement element of this type is more resistant to fatigue, even under extreme conditions.

The viscose multifilament yarn is a rayon multifilament yarn or a lyocell filament yarn.

In a further embodiment of the invention, the further non-metallic multifilament yarn is a polyamide multifilament yarn, preferably a PA66 multifilament yarn. A higher elastic modulus and lower shrinkage as well as increased stability at a smaller cord diameter than with, for example, a cord construction PA66 940×2 have been achieved.

In a first, preferred embodiment of the invention, the hybrid cord consists of two multifilament yarns, of which the first multifilament yarn is a rayon multifilament yarn and the further multifilament yarn a PA66 multifilament yarn. The hybrid cord has the construction rayon 780×1+PA66 700×1, 450 tpm S(Z)+450 tpm S(Z), 450 tpm Z(S).

The filaments of each rayon multifilament yarn have a filament linear density of 3 dtex. The breaking tenacity of a rayon multifilament yarn lies in the range from ≥45 cN/tex to ≤53 cN/tex. Each rayon multifilament yarn has an elongation at break in the range from ≥6% to ≤15%. The hybrid cord has a diameter of 0.48 mm. Further parameters of the hybrid cord are found in Table 1.

In a second, preferred embodiment of the invention, the hybrid cord consists of two multifilament yarns, of which the first multifilament yarn is a rayon multifilament yarn and the further multifilament yarn an aramid multifilament yarn. The hybrid cord has the construction rayon 620×1+aramid 550×1, 600 tpm S(Z)+600 tpm S(Z), 600 tpm Z(S). The filaments of each rayon multifilament yarn have a filament linear density of 2.4 dtex. The breaking tenacity of a rayon multifilament yarn lies in the range from ≥45 cN/tex to ≤53 cN/tex. Each rayon multifilament yarn has an elongation at break in the range from ≥6% to ≤15%. The hybrid cord has a diameter of 0.40 mm. Further parameters of the hybrid cord are found in Table 1.

In a third, preferred embodiment of the invention, the hybrid cord consists of three multifilament yarns, of which the first multifilament yarn is a rayon multifilament yarn, the second multifilament yarn is an aramid multifilament yarn, and the third multifilament yarn is a rayon multifilament yarn identical to the first multifilament yarn. The hybrid cord has the construction rayon 620×1+aramid 550×1+rayon 620×1, 600 tpm S(Z)+600 tpm S(Z)+600 tpm S(Z), 600 tpm Z(S). The filaments of each rayon multifilament yarn have a filament linear density of 2.4 dtex. The breaking tenacity of a rayon multifilament yarn lies in the range from ≥45 cN/tex to ≤53 cN/tex. Each rayon multifilament yarn has an elongation at break in the range from ≥6% to ≤15%. The hybrid cord has a diameter of 0.50 mm. Further parameters of the hybrid cord are found in Table 1.

In a further embodiment of the invention, the first multifilament yarn is a rayon multifilament yarn and the further multifilament yarn an HMLS PET multifilament yarn, wherein the hybrid cord has the construction rayon 620×1+ HMLS PET 550×1, 500 tpm S(Z)+500 tpm S(Z), 500 tpm Z(S). The filaments of each rayon multifilament yarn have a filament linear density of 2.4 dtex. The breaking tenacity of a rayon multifilament yarn lies in the range from ≥45 cN/tex to ≤53 cN/tex. Each rayon multifilament yarn has an elongation at break in the range from ≥6% to ≤15%.

Apart from that, the type or construction of the cellulosic fibers is subject to no limitations. Thus, the viscose multifilament yarn as such, or as chopped fibers, can be processed into a reinforcement element or a woven or knitted fabric. It is also possible to use the reinforcement element containing the viscose multifilament yarn directly for producing a tire.

The following Table 1 provides an exemplary overview of the parameters of preferred inventive hybrid cords.

TABLE 1

| parameter | Example 1 | Example 2 | Example 3 |
|---|---|---|---|
| Material | Rayon + PA66 | Rayon + aramid | Rayon + aramid + rayon |
| Cord construction | 780×1 + 700× | 620×1 + 550× | 620×1 + 550×1 + 620 |
| Turns [tpm] | 450 | 600 | 600 |
| Breaking force [N] | 72 | 97 | 115 |
| Elongation at break [%] | 10 | 6.6 | 8.5 |
| Elongation @ 45N [%] | 6 | 4 | 3.2 |
| Diameter [mm] | 0.48 | 0.40 | 0.50 |

Diagram 1 shows the force/elongation curves of the inventive hybrid cord 1 described in Table 1 (rayon 780+ PA66 700) and of a cord of the prior art (PA66 940×2).

The inventive hybrid cord 1 is, for example, preferred in the belt binder of a pneumatic vehicle tire. Advantageously, the elastic modulus of the hybrid cord is comparatively high due to the rayon multifilament yarn, while PA66 is responsible for the shrinking effect required for belt binder applications.

Diagram 2 shows force/elongation curves of the inventive hybrid cords 2 and 3 described in Table 1 (rayon 620+aramid 550) and (rayon 620+aramid 550+rayon 620) as well as a cord of the prior art (rayon 1220×2).

The inventive hybrid cords 2, 3 have lower elastic modulus values than the cord of the prior art, but the cord diameters are advantageously small. With an optimization, preferably an increase in the cord density in a woven layer having these hybrid cords, the desired rigidity can be reached at a low layer thickness. Rayon and aramid are stable materials that do not shrink.

The force/elongation measurements are performed based on ASTM D885.

The invention claimed is:

1. A hybrid cord comprising at least two multifilament yarns twisted together, wherein:
   a first yarn is a viscose multifilament yarn;
   a second yarn is a non-metallic multifilament yarn composed of a material that is not identical to the first yarn;
   the viscose multifilament yarn has been conditioned in a standard climate in accordance with DIN EN ISO 139:2011-10 and has a yarn linear density <1100 dtex and a breaking tenacity of ≥45 cN/tex; and
   the hybrid cord has a cord linear density of ≤3000 dtex.

2. The hybrid cord according to claim 1, wherein the second yarn has a yarn linear density in the range from ≥50 to ≤1800 dtex.

3. The hybrid cord according to claim 1, wherein the hybrid cord has a cord linear density ≤2500 dtex.

4. The hybrid cord according to claim 1, wherein the viscose multifilament yarn has a yarn linear density in the range from ≥150 dtex to ≤1100 dtex.

5. The hybrid cord according to claim 4, wherein the viscose multifilament yarn has a yarn linear density in the range from ≥200 dtex to <800 dtex and a breaking tenacity in the range from ≥45 cN/tex to ≤53 cN/tex.

6. The hybrid cord according to claim 1, wherein the viscose multifilament yarn has a filament linear density in the range from 1.2 to 4.0 dtex.

7. The hybrid cord according to claim 1, wherein the viscose multifilament yarn has an elongation at break in the range from ≥5% to ≤20%.

8. The hybrid cord according to claim 1, wherein the second yarn is an aramid multifilament yarn or a polyamide multifilament yarn.

9. The hybrid cord according to claim 1, wherein the second yarn is a polyester multifilament yarn.

10. The hybrid cord according to claim 1, wherein the second yarn has a yarn linear density in the range from ≥250 to ≤800 dtex.

11. The hybrid cord according to claim 1, wherein:
    the first yarn is a rayon multifilament yarn;
    the second yarn is a PA66 multifilament yarn; and
    the hybrid cord has the construction rayon 780×1+PA66 700×1.

12. The hybrid cord according to claim 1, wherein:
    the first yarn is a rayon multifilament yarn;
    the second yarn is an aramid multifilament yarn; and
    the hybrid cord has the construction rayon 620×1+aramid 550×1.

13. The hybrid cord according to claim 12, further comprising
    a third multifilament yarn that is a rayon multifilament yarn identical to the first yarn, wherein
    the hybrid cord has the construction rayon 620×1+aramid 550×1+rayon 620×1.

14. The hybrid cord according to claim 1, wherein the second yarn has a yarn linear density in the range from ≥200 to ≤1200 dtex.

15. The hybrid cord according to claim 1, wherein the hybrid cord has a cord linear density ≤2000 dtex.

16. The hybrid cord according to claim 1, wherein the viscose multifilament yarn has a yarn linear density in the range from ≥170 dtex to <900 dtex and a breaking tenacity in the range from ≥45 cN/tex to ≤60 cN/tex.

17. The hybrid cord according to claim 1, wherein the viscose multifilament yarn has a yarn linear density in the range from ≥170 dtex to <900 dtex and a breaking tenacity in the range from ≥45 cN/tex to ≤56 cN/tex.

18. The hybrid cord according to claim 1, wherein the viscose multifilament yarn has a filament linear density in the range from 2.4 to 3.0 dtex.

19. The hybrid cord according to claim 1, wherein the viscose multifilament yarn has an elongation at break in the range from ≥6% to ≤15%.

20. The hybrid cord according to claim 1, wherein the second yarn is a PA66 multifilament yarn.

21. The hybrid cord according to claim 1, wherein the second yarn is a PET multifilament yarn.

22. The hybrid cord according to claim 1, wherein the second yarn is a high-modulus low-shrinkage PET multifilament yarn.

23. The hybrid cord according to claim 1, wherein:
the first viscose multifilament yarn is a rayon multifilament yarn;
the second yarn is a PA66 multifilament yarn; and
the hybrid cord has the construction rayon 780×1+PA66 700×1 twisted with 450 tpm S(Z)+450 tpm S(Z), 450 tpm Z(S).

24. The hybrid cord according to claim 1, wherein:
the first yarn is a rayon multifilament yarn;
the second yarn is an aramid multifilament yarn; and
the hybrid cord has the construction rayon 620×1+aramid 550×1 twisted with 600 tpm S(Z)+600 tpm S(Z), 600 tpm Z(S).

25. The hybrid cord according to claim 12, comprising a third multifilament yarn being a rayon multifilament yarn identical to the first yarn, wherein
the hybrid cord has the construction rayon 620×1+aramid 550×1+rayon 620×1 twisted with 600 tpm S(Z)+600 tpm S(Z), 600 tpm Z(S).

* * * * *